United States Patent [19]

Toba et al.

[11] 4,417,025

[45] Nov. 22, 1983

[54] RESIN COMPOSITION EMULSION

[75] Inventors: Hirotaka Toba, Ohimachi; Masatoshi Mikumo, Kamiitabashi; Masahiro Asami, Ohimachi, all of Japan

[73] Assignee: Daicel Chemical Industries, Ltd., Osaka, Japan

[21] Appl. No.: 337,335

[22] Filed: Jan. 6, 1982

[30] Foreign Application Priority Data

Jan. 13, 1981 [JP] Japan ................................ 56/3508
Jun. 16, 1981 [JP] Japan ................................ 56/93647

[51] Int. Cl.$^3$ ...................... C08G 59/02; C08L 1/08
[52] U.S. Cl. .......................... 525/54.21; 525/54.23; 527/313; 527/314; 527/315
[58] Field of Search .................. 525/54.21, 54.23; 527/313, 314, 315

[56] References Cited

U.S. PATENT DOCUMENTS 3,044,972 7/1962 Segro et al. ...................... 525/54.23
3,889,678 6/1975 Chatterjee et al. ................. 527/314

FOREIGN PATENT DOCUMENTS 2612846 10/1976 Fed. Rep. of Germany ...... 527/314

*Primary Examiner*—Maurice J. Welsh
*Assistant Examiner*—Nathan M. Nutter
*Attorney, Agent, or Firm*—Flynn, Thiel, Boutell & Tanis

[57] ABSTRACT

A resin composition is prepared by emulsion-polymerizing a cellulose ester and at least one radical-polymerizable unsaturated monomer in the aqueous medium under the presence of a dispersion stabilizer, said cellulose ester having been modified by chemically bonding thereonto a polymeric chain compatible with a polymer obtained from said radical-polymerizable unsaturated monomer.

13 Claims, No Drawings

RESIN COMPOSITION EMULSION

The present invention relates to a resin composition emulsion containing a cellulose ester to which a vinyl polymer is bonded (grafted).

As the process for the preparation of a cellulose derivative-containing emulsion, there can be mentioned a process disclosed in Japanese Patent Application Laid-Open Specification No. 28188/76. A coating of a nitrocellulose-containing emulsion obtained according to this process is excellent in the gasoline resistance, polishing property and luster and is superior to conventional emulsion coatings in the anti-blocking property and other properties. This coating, however, is poor in the strength and is readily fissured or cracked. Therefore, the application field of this coating is limited. Emulsions obtained from cellulose derivatives other than nitrocellulose, such as cellulose acetate butyrate and cellulose acetate propionate, according to this process are heterogeneous emulsions in which the cellulose derivative alone is free from a radical-polymerizable unsaturated monomer added to the polymerization system together with the cellulose derivative, or heterogeneous emulsions comprising coagulated particles occupied mainly by the cellulose derivative, in which the ratio between the cellulose derivative and a polymer formed of the radical-polymerizable unsaturated monomer is greatly different from the mixing ratio between the cellulose derivative and the radical-polymerizable unsaturated monomer added to the polymerization system, and particles occupied mainly by the polymer formed of the radical-polymerizable unsaturated monomer. In this process, if a special care is taken so as to enhance the emulsion dispersibility, a seemingly homogeneous emulsion is sometimes obtained. However, a coating of such emulsion is poor in the luster and is opaque and brittle, and therefore, this coating cannot be put into practical use at all.

We made researches with a view to eliminating the foregoing defects involved in the conventional technique and obtaining a cellulose derivative-containing emulsion capable of providing a transparent, lustrous and tough coating, and we found that if a vinyl polymer is bonded (grafted) to a cellulose ester by intermolecular reaction and the resulting graft type cellulose ester is employed, a high-capacity resin composition emulsion having none of the above-mentioned defects can be obtained. We have now completed the present invention based on this finding.

The invention is related to a resin composition emulsion which is obtained by emulsion-polymerizing in an aqueous medium in the presence of a dispersion stabilizer a cellulose ester and at least one radical-polymerizable unsaturated monomer, said cellulose ester having been modified by chemically bonding thereonto a polymeric chain compatible with a polymer obtained from said radical-polymerizable unsaturated monomer.

As a preferred embodiment of the invention, there is provided a resin composition emulsion which is obtained by emulsion polymerizing in an aqueous medium in the presence of a dispersion stabilizer a mixture comprising at least one cellulose ester to which a vinyl polymer is bonded (grafted), said cellulose ester being obtained by intermolecular reaction between a vinyl polymer containing at least one functional group selected from an epoxy group, a carboxyl group, an acid halide, an acid anhydride, an isocyanate group, an active halogen atom, an N-methylol group and an N-methylol ether group and a cellulose ester, and at least one radical-polymerizable unsaturated monomer.

In the resin composition emulsion of the present invention, the vinyl polymer is bonded to the cellulose ester, and if a vinyl polymer having a good compatibility with a polymer formed of the radical-polymerizable unsaturated monomer used in the present invention is selected as such vinyl polymer to be bonded to the cellulose ester, the compatibility of the vinyl polymer-grafted cellulose ester with the polymer of the radical-polymerizable unsaturated monomer can be highly improved over the compatibility of the vinyl polymer-free cellulose ester with the polymer of the radical-polymerizable unsaturated monomer.

Since the vinyl polymer-grafted cellulose ester used in the present invention has a good compatibility with both the cellulose ester and the polymer formed of the radical-polymerizable unsaturated monomer, even if the vinyl polymer-free cellulose ester is present together with the vinyl polymer-grafted cellulose ester, the compatibility and mixing state of the vinyl polymer-free cellulose ester with the polymer of the radical-polymerizable unsaturated monomer are improved by the action of the vinyl polymer-grafted cellulose ester.

The vinyl polymer-grafted cellulose ester (often referred to as "grafted cellulose ester" hereinafter) of the present invention is different from ordinary grafted cellulose esters to some extent. In ordinary graft polymers, radicals are generated on a trunk polymer (cellulose ester) by some method or other, and branch polymers formed by polymerization of the monomer grow from such radicals (active points). In the vinyl polymer-grafted cellulose ester of the present invention, since intermolecular reaction is effected between the cellulose ester and the vinyl polymer, the functional groups of the vinyl polymer are seldom present on the terminals and they are often present in the intermediate portion of the vinyl polymer chain. Accordingly, the cellulose ester and the vinyl polymer are often bonded in a criss-cross pattern. In the grafted cellulose ester of the present invention, the composition and molecular weight of the vinyl polymer can easily be controlled, and the intermolecular reaction between the polymers can be forcibly performed. Accordingly, in the present invention, formation of the grafted cellulose ester can be expected with certainty. In the present invention, by using this grafted cellulose ester, a good compatibility is maintained among the respective polymers (cellulose ester, grafted cellulose ester and polymer formed of the monomer) and they are mixed and dispersed in one another in a good condition. Furthermore, a mixture of the grafted cellulose ester and the radical-polymerizable unsaturated monomer is more finely divided by a dispersion stabilizer than a mixture of the non-grafted cellulose ester and the radical-polymerizable unsaturated monomer, and hence, a better emulsion state is provided. Therefore, the obtained cellulose ester-containing emulsion provides a coating having a higher strength and a better luster than coatings obtained from conventional emulsions of this type.

Moreover, the resin composition emulsion of the present invention retains a good tackiness-free touch of the surface of a coating on a coated article, that is an inherent characteristic of a cellulose ester-containing emulsion, and it is excellent in the gasoline resistance and polishing property. Therefore, it is expected that the resin composition emulsion of the present invention can be effectively used as a paint for wood, paper, metal, leather, plastics and construction materials and also as a printing ink, an adhesive, a molding material, a resin additive and the like.

As the vinyl polymer having at least one functional group selected from an epoxy group, a carboxyl group, an acid halide, an acid anhydride, an isocyanate group, an active halogen atom, an N-methylol group and an N-methylol ether group, that is used in the present invention, there can be mentioned a polymer consisting of at least one radical-polymerizable unsaturated monomer, which contains at least one functional group selected from the above-mentioned functional groups in the polymer chain. A polymer obtained by introducing such functional group into a polymer prepared from a radical-polymerizable unsaturated monomer by a post treatment such as hydrolysis is included in the functional group-containing vinyl polymer, but in many cases, intended functional group-containing polymers are prepared by introduction of such functional group by homopolymerization or copolymerization of radical-polymerizable unsaturated monomers having such functional group.

The radical-polymerizable unsaturated monomer used for the production of the vinyl polymer containing such functional group is not particularly critical, so far as it has a radical-polymerizable, ethylenically unsaturated bond ($>C=C<$). As typical instances, the following compounds can be mentioned.

(1) Acrylic acid and methacrylic acid esters represented by the following general formula:

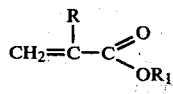

wherein R stands for a hydrogen atom or a methyl group and $R_1$ stands for an alkyl group having 1 to 20 carbon atoms, a cycloalkyl group having 5 or 6 carbon atoms, a methoxybutyl group, an ethoxybutyl group, a phenyl group, a benzyl group, an allyl group, a hydroxyalkyl group having 2 to 8 carbon atoms, a dicyclopentinyl group or a polyethylene glycol group.

(2) Amides of acrylic acid and methacrylic acids such as acrylamide and N-methylolacrylamide.

(3) Vinyl aromatic compounds represented by the following general formula:

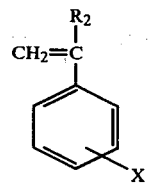

wherein $R_2$ stands for a hydrogen atom or a methyl group, and X stands for a hydrogen atom, a methyl group, a halogen atom, a nitro group, an amino group or an N-(alkyl)$_2$ group.

(4) Other monomers such as vinyl acetate, ethylene, butadiene, chloroprene, isoprene, acrylonitrile, vinyl chloride and carboxylic acid vinyl esters.

(5) Functional group-containing vinyl monomers such as glycidyl acrylate, glycidyl methacrylate, allylglycidyl ether, acrylic acid chloride, methacrylic acid bromide, acrylic acid, methacrylic acid, maleic anhydride and fumaric acid.

These unsaturated monomers may be used singly or in the form of a mixture of two or more of them. For example, a polymer obtained by partially hydrolyzing a homopolymer of an acrylic acid ester or methacrylic acid ester to introduce a carboxyl group can be used.

A functional group-containing vinyl polymer may be prepared by polymerizing a monomer such as mentioned above according to a known polymerization process, for example, the solution polymerization process, the suspension polymerization process or the emulsion polymerization process and performing a necessary post treatment. Among these polymerization processes, the solution polymerization process is most preferred. The solution polymerization may be accomplished by conducting reaction in an appropriate inert solvent in the presence of a polymerization initiator (polymerization catalyst) at a reaction temperature of 0° to about 200° C., preferably 30° to 150° C. (0° to 90° C., preferably 30° to 80° C. in the case where an epoxy group-containing unsaturated monomer is used) for about 0.5 to about 20 hours, preferably about 2 to about 10 hours.

A solvent capable of dissolving the formed polymer therein is preferably used as the solvent, and when a monomer containing an epoxy group or acid halide as the functional group, in order to prevent modification of the functional group, it is preferred that a solvent having no active hydrogen atom be selected and used.

A known polymerization catalyst such as an azo compound, an organic peroxide, a sulfide, a sulfine, a nitroso compound or other radical initiator is used as the polymerization catalyst.

A known chain transfer agent such as a mercaptan compound or an α-methylstyrene dimer may be used.

The so-prepared functional group-containing vinyl polymer has a molecular weight of about 300 to about 200,000, preferably about 300 to about 20,000. If the molecular weight is higher than 200,000, when a cellulose ester to which this vinyl polymer is bonded is used, the cellulose content becomes too low. As regards the number of the functional groups in one molecule, it is preferred that one functional group be present in case of the epoxy group or acid halide and at least one functional group be present in case of the acid or acid anhydride. In case of the epoxy group or acid halide, in order to prevent gelation by crosslinking reaction with the cellulose ester, the number of the functional groups can be adjusted so that 0.5 to 1.0 of the functional group is present per number average molecular weight.

The cellulose ester to be reacted with the functional group-containing vinyl polymer in the present invention is not particularly critical, so far as it has a functional group capable of reacting with at least one of the functional groups of the vinyl polymer, such as a hydroxyl, carboxyl or amino group. As such cellulose ester, there can be mentioned, for example, nitrocellulose, cellulose acetate butyrate, cellulose acetate propionate, cellulose acetate phthalate, acetyl cellulose, cellulose propionate, cellulose butyrate, cellulose phosphate and cellulose sulfate.

The molecular weight and substitution degree of the cellulose ester are not particularly critical.

Synthesis of the vinyl polymer-bonded (grafted) cellulose ester of the present invention is accomplished by mixing the functional group-containing polymer with the cellulose ester and conducting reaction at 0° to 200°

C. Ordinarily, the functional group-containing vinyl polymer in the form of a solution polymerization product is mixed with a solution of the cellulose ester and reacting them at an appropriate reaction temperature selected from the range of 0° to 200° C. for 1 minute to about 5 hours, whereby a vinyl polymer-bonded cellulose ester is obtained. However, the preparation process is not limited to this process. For example, there may be adopted a process in which the functional group-containing vinyl polymer and the cellulose ester, optionally with a cellulose ester plasticizer, are melted and mixed in the absence of a solvent by a conventional mixer such as a hot roll mixer, a Banbury mixer or an extruder. In the synthesis of the vinyl polymer-bonded cellulose ester, the mixing method or the reaction time is not particularly critical.

In the above-mentioned synthesis, a reaction promoter may be added according to the need.

In the present invention, at least one radical-polymerizable unsaturated monomer is used in the form of a mixture with the vinyl polymer-bonded cellulose ester. The kind of the radical-polymerizable unsaturated monomer is not particularly critical, so far as it has a radical-polymerizable, ethylenically unsaturated bond. All of the unsaturated monomers mentioned above with respect to the functional group-containing vinyl polymer can be used.

The dispersion stabilizer used in the present invention is not particularly critical, so far as it is capable of emulsifying and dispersing a mixture of at least one vinyl polymer-bonded cellulose ester and at least one radical-polymerizable unsaturated monomer and maintaining stably an emulsion formed by emulsion polymerization. For example, there may be used anionic, non-ionic, cationic and amphoteric surface active agents, organic protecting colloids, and hydrophilic and water-soluble resins.

Typical instances of the dispersion stabilizer used in the present invention are as follows.

(1) Anionic surface active agents such as carboxylates (for example, fatty acid soaps), sulfates (for example, sodium lauryl sulfate), sulfated natural oils and esters (for example, alkylaryl polyether sulfate), sulfonates (for example, alkylaryl polyether sulfonate and isopropyl naphthalene-sulfonate), sulfo-succinates, sulfo-succinamates, phosphate esters (for example, partial esters of short-chain aliphatic alcohols with composite phosphates), and orthophosphate esters of polyethoxylated aliphatic alcohols.

These anionic surface active agents are often used in the form of alkali metal, ammonium or amine salts.

(2) Non-ionic surface active agents such as ethylene oxide-modified monohydric and polyhydric alcohols, ethylene oxide/propylene oxide copolymers, esters (for example, glyceryl monostearate), dehydration products of sorbitol (for example, sorbitan monostearate), and amides (such as lauric isopropanolamide).

(3) Cationic surface active agents such as lauryl-dimethylbenzyl ammonium chloride, N-(laurylcolamine-formylmethyl)pyridinium chloride, and other amine salts and quaternary ammonium salts.

(4) Organic protecting colloids such as polyvinyl alcohol, hydroxyethyl cellulose, hydroxypropyl cellulose, a sodium salt of carboxymethyl cellulose, alginic acid salts and polysaccharides.

(5) Hydrophilic and water-soluble resins such as water-soluble acrylic resins, maleic polybutadiene, maleic oils, maleic alkyd resins, and intermolecular reaction products between water-soluble acrylic resins and vinyl resins containing a functional group (for example, an epoxy group).

These dispersion stabilizers may be used singly or in the form of a mixture of two or more of them. The amount of the dispersion stabilizer is ordinarily about 0.1 to about 20% based on the final emulsion composition, though the amount of the dispersion stabilizer is not particularly critical.

The kinds and amounts of the polymerization catalyst (radical initiator) and chain transfer agent used for emulsion-polymerizing a mixture of at least one vinyl monomer-bonded (grafted) cellulose ester and at least one radical-polymerizable, unsaturated monomer in an aqueous medium in the presence of a dispersion stabilizer are not particularly critical, but known agents may be used in known amounts.

The vinyl polymer-bonded (grafted) cellulose ester may contain the unreacted cellulose ester in some synthesis processes. Even in this case, the vinyl polymer-bonded (grafted) cellulose ester exerts a function of producing a good compatibility between the polymer formed of at least one radical-polymerizable unsaturated monomer to be mixed and the unreacted cellulose derivative. Accordingly, an emulsion composition prepared by adding an unreacted cellulose ester of the same kind as that of the vinyl polymer-bonded (grafted) cellulose ester according to need and emulsion-polymerizing a mixture of the unreacted cellulose ester, the vinyl polymer-bonded (grafted) cellulose ester and the radical-polymerizable unsaturated monomer is included in the scope of the present invention.

Film-forming assistants such as a solvent and a plasticizer may be added to the above-mentioned mixture at the emulsion polymerization step.

In a coating formed from the so-prepared resin composition emulsion, the compatibility between the cellulose ester and the polymer formed of the unsaturated monomer is enhanced and they are sufficiently dispersed in each other, and therefore, this coating is excellent over a coating formed from a conventional cellulose ester-containing emulsion in the toughness and luster and the emulsion of the present invention can be widely used in the fields of general-purpose paints, adhesives, resin-processing additives and molding plastics. Furthermore, film-forming assistants, plasticizers, dyes, pigments, defoaming agents, rust-preventing agents, mildew-proofing agents, water-soluble resins and cross-linking agents such as melamine may be added to the emulsion composition of the present invention in known amounts according to need. Moreover, the emulsion of the present invention may be mixed with other emulsions according to need.

Another embodiment according to the invention will be illustrated below. The emulsion can also be produced by subjecting a mixture of a random graft cellulosic polymer obtained by polymerizing a polymerizable monomer (1) in the presence of a cellulosic polymer and a polymerizable monomer (2) to the ordinary emulsion polymerization in a dispersing medium. The obtained emulsion is improved to produce a transparent, glossy and tough coating.

The cellulosic polymer used in this invention is not limited to special ones so long as it gives an emulsion that forms a non-sticky, smooth coating and improves the coating properties such as sandability. Typical examples of such cellulosic polymer include cellulose; cellulose adduct such as alkali cellulose; cellulose derivatives of ester modified type such as nitrocellulose, cellulose acetate butyrate, cellulose acetate propionate, acetyl cellulose, cellulose sulfate, and cellulose phosphate; and cellulose derivatives of ether modified type such as methylcellulose, ethylcellulose, butylcellulose, carboxymethylcellulose and hydroxyethylcellulose. Those of the ester-modified type are advantageous in respect to easy graft-reaction, industrial handling and properties of finish coating emulsion containing the cellulose derivative. In particular, nitrocellulose, cellulose acetate-butyrate and acetylcellulose are preferable in view of easy availability in industry and relative cheapness. These cellulose derivative is not limited in respect to a molecular weight, but an average molecular weight thereof is preferred to be about 5,000 to 50,000. If it is more than 50,000, a particle size of the resulting emulsion gets larger and eventually the emulsion lowers with regard to the dispersion state. If it is less than 5,000, the finish coated film of the emulsion containing the cellulose derivative gets fragile. A single or more than one cellulose derivative may be used in the invention.

The polymerisable monomer (1) to be bonded onto the cellulosic polymer is polymerized by conventional polymerization processes, such as addition polymerization, condensation polymerization, polyaddition, ring-opening polymerization, isomerization polymerization, cyclic polymerization, elimination polymerization and addition condensation, including for example, a polymerizable unsaturated compound such as styrene, vinyl chloride, methyl methacrylate, acrylic acid and acrylonitrile, a polymerizable cyclic compound such as ethylene oxide, $\epsilon$-caprolactam and $\beta$-propiolactam, and a polymerisable, polyfunctional additve such as terephthalic acid, ethylene glycol, adipic chloride, hexamethylenediamine, tolylene diisocyanate and dimethylsiloxane. Typical ones of the monomers are disclosed in "Polymer Experience, vol. II, Monomer I" compiled by editor committee of polymer experience in Polymer Institute and published by Kyoritsu Shuppan in 1976, and then "Polymer Experience, vol. III, Monomer II" compiled by the same committee and published by the same in 1977. It is sufficient in the invention that among the monomers, the polymerizable monomer (i) provides a random graft cellulosic polymer through polymerization in the presence of cellulose for the cellulosic polymer. They are not specified in other meanings.

The polymerizable monomers, defined before in statement about the first embodiment of the invention, are selected and used singly or in combination so that the polymer derived from the polymerizable monomer (1) is miscible chemically or physically with the polymerizable monomer (2) and the polymer which is derived from the polymerizable monomer (2) and constitute the particles of the emulsion. The miscibility is predictable from the solubility parameter or the composition of the two polymers. Thus, with this in mind, the polymerizable monomers (1) of adequate composition should be selected. For instance, if the polymerizable monomer (2) consists mostly of an acrylic or methacrylic ester (more than 50% of the total), it is desirable that the polymerizable monomer (1) also consists mainly of an acrylic or methacrylic ester. The alcohol residue of the acrylic or methacrylic ester may be slightly modified; for instance, methyl methacrylate may be replaced by n-butyl methacrylate.

If the composition of the polymerizable monomer (2) is entirely different from that of the polymerizable monomer (1), it is desirable that the absolute value of the difference of the solubility parameter should be less than 1.0 between the polymer derived from the polymerizable monomer (2) and the polymer derived from the polymerizable monomer (1). If the absolute value of the solubility parameter exceeds this limit, the polymers are poor in miscibility with each other, and the resulting cellulose derivative-containing emulsion gives a coating which is poor in gloss and transparency. In contrast with this, the two polymers are quite miscible if the composition of the polymerizable monomer (2) is identical with that of the polymerizable monomer (1).

It is preferable to use a polymerizable monomer (1) such as butadiene, which introduces functional groups which the polymerizable monomer (2) grafts during emulsion polymerization into the polymer derived from the polymerizable monomer (1), as at least one component of the polymerizable monomer (1), because the polymerizable monomer (2) grafts additionally to the random graft cellulosic polymer during emulsion polymerization, with the resulting improvement in the miscibility of the polymer derived from the polymerizable monomer (1) and that derived from the polymerizable monomer (2).

The process for producing the random graft cellulosic polymer is not limited to a specific manner; but the known process to produce a graft polymer by polymerizing a polymerizable monomer in the presence of a cellulosic polymer can be employed. Examples of such known processes are given below.

(1) Mechanochemical grafting process in which a cellulosic polymer is broken mechanically so as to form radical active sites in the cellulosic polymer and a polymerizable monomer is grafted to them.

(2) A graft polymerization method in which functional groups such as hydroperoxide group and azo group which cause the radical polymerization to start are introduced into a cellulosic polymer and a polymerizable monomer is grafted to the active sites.

(3) A graft polymerization method in which a polymerizable monomer is grafted to a cellulosic polymer by redox polymerization which employs a metal ion such as a ceric salt.

(4) A graft polymerization method in which non-catalytic polymerization is accomplished in the coexistence of a cellulosic polymer, water, and a radical-polymerizable unsaturated monomer such as methyl methacrylate.

(5) A graft polymerization method in which a radical polymerization initiator such as trialkyl boron is used for a cellulosic polymer, water, and a radical-polymerizable unsaturated monomer such as methyl methacrylate.

(6) A graft polymerization method in which a cellulosic polymer is irradiated with gamma rays or ultraviolet rays and a polymerizable monomer is grafted to radical active sites formed by irradiation on the cellulosic polymer.

(7) A graft polymerization method in which a cellulosic polymer is previously incorporated with a chemically active group such as carbon-halogen bond and thiol group and radical polymerization is accomplished for a radical-polymerizable monomer in the presence of the cellulosic polymer having chemically functional groups.

(8) A graft polymerization method in which a polymerizable monomer is reacted with an unsaturated group introduced into a cellulosic polymer.

(9) A graft polymerization method in which polycondensation, polyaddition, or ring opening polymerization is performed for a cellulosic polymer having therein a comparatively reactive functional group such as carboxyl group and amino group and a polymerizable monomer which reacts with such a functional group to give a polymer.

(10) A graft polymerization method in which a polymerizable monomer is grafted to a cellulosic polymer by ion polymerization.

These processes are described in "Gurafuto Jugo to Sono Ouyo" [Graft Polymerization and Its Application] written by Fumio Ide (published by Kobunshi Kankokai [Polymer Publishing Association] in 1977); "Kobunshi Jikkengaku" [Polymer Experiments], Vol 6, Polymer Reaction, edited by "Kobunshi Gakkai" [the Society of Polymer Science, the Editorial Committee for Polymer Experiment], pp. 148–189 and 191–192 (issued by Kyoritsu Shuppan [Kyoritsu Publishing Co., Ltd.] in 1978); and "Kobunshi Kako" [Polymer Processing], Vol. 23, November issue, pp. 519–525 (issued by Kobunshi Kankokai [Polymer Publishing Association] in 1974.

The random graft cellulosic polymer in this invention can be obtained by radical polymerization of a radical polymerizable unsaturated monomer as the polymerizable monomer (1) and a cellulosic polymer. This process is easy to perform and advantageous industrially.

The polymeric portion derived from the polymerizable monomer (1) bonding to the random graft cellulosic polymer should have a number-average molecular weight of about 300 to about 200,000, preferably about 300 to about 20,000. If the molecular weight is higher than 200,000, the content of the cellulosic polymer is decreased in the random graft cellulosic polymer to which the polymer derived from the polymerizable monomer (1) bonds. If the molecular weight is lower than 300, the effect of grafting the polymer derived from the polymerizable monomer (1) is not sufficient. In this invention, one or more than one kind of the random cellulosic polymer may be used.

The random graft cellulosic polymer in this invention may contain a part of the cellulosic polymer to which the polymer derived from the polymerizable monomer (1) does not bond, because grafting does not necessarily take place on all the molecules of the cellulosic polymer used. This is dependent on the process employed. Nevertheless, it is possible to prepare a uniform emulsion containing cellulose derivatives because the cellulosic polymer to which the polymer derived from the polymerizable monomer (1) bonds has miscibility with and acts as intermediary for the three components of [a] the cellulosic polymer to which the polymer derived from the polymerizable monomer (1) does not bond, [b] the polymerizable monomer (2), and [c] the polymer derived from the polymerizable monomer (1). If necessary, the same effect as above can also be achieved by adding to the system the cellulosic polymer used for the production of the random graft cellulosic polymer and the cellulosic polymer to which the polymer derived from the polymerizable monomer (1) does not bond.

The polymerizable monomer (2) may be a single monomer or a mixture of monomers which dissolves the random graft cellulosic polymer. A typical example of the polymerizable monomer (2) is the radical polymerizable monomer among the polymerizable monomers (1).

The random graft cellulosic polymer and the polymerizable monomer (2) which dissolves the former may be present in any weight ratio in this invention; however, preferably the weight ratio should be in the range from 1:99 to 55:45. A proper weight ratio should be selected according to the performance required for the final cellulosic derivative-containing emulsion to be obtained.

The emulsion polymerization can be accomplished by the known technology which includes the use of additives for polymerization reaction such as polymerization initiator, catalyst, dispersion stabilizer, and molecular weight modifier; emulsion property improvers such as plasticizer and film-forming aid; and general additives such as dye, pigment, anti-fungus agent, and anti-foaming agent.

The emulsion obtained according to the invention is composed of miscible components and provides a coating which is tougher and glossier than that of the conventional cellulose derivative-containing emulsion. In addition, the coating of the emulsion of this invention retains the unique characteristics—the absence of stickiness of the coating surface—of the coating of the conventional cellulose derivative-containing emulsion. Furthermore, the coating of the emulsion of the invention has smooth surface, good gasoline resistance, and sandability. Thus, the emulsion of this invention will find use as a general coating material, adhesive, and resin treatment material. If the emulsion of this invention is separated into the continuous medium and the resin component, the separated resin component will be used as a plastic molding material.

The present invention will now be described in detail with reference to the following Examples.

EXAMPLE 1

(1) A reaction vessel equipped with a stirrer, a reflux cooler and a dropping funnel was charged with 43.5 parts of ethylene glycol monobutyl ether in a nitrogen atmosphere, and the ether was heated at 120° C. Then, a mixture of 15.1 parts of methyl methacrylate, 6.7 parts of ethyl acrylate, 9.4 parts of acrylic acid, 17.2 parts of 2-ethylhexyl methacrylate and 2.8 parts of $\alpha,\alpha'$-azobis(isobutyronitrile) was added dropwise over a period of 2 hours. After completion of the dropwise addition, a mixture of 0.4 part of $\alpha,\alpha'$-azobis(isobutyronitrile) and 4.9 parts of ethylene glycol monobutyl ether was added over a period of 1 hour. Then, polymerization was conducted at 120° C. for 7 hours to obtain a water-soluble polymer solution having a solid content of 50.2%.

(2) Separately, a different reaction vessel equipped with a stirrer, a reflux cooler and a dropping funnel was charged with 43.1 parts of acetyl ethylene glycol methyl ether in a nitrogen atmosphere and the ether was heated at 70° C. Then, a mixture of 47.4 parts of n-butyl methacrylate, 1.5 parts of glycidyl methacrylate, 0.7 part of n-dodecylmercaptan and 2.2 parts of $\alpha,\alpha'$-azobis(isobutyronitrile) was added over a period of 2 hours. After completion of the dropwise addition, a mixture of 0.4 part of $\alpha,\alpha'$-azobis(isobutyronitrile) and 4.7 parts of acetyl ethylene glycol ether was added over a period of 1 hour. Then, polymerization was conducted at 70° C. for 7 hours to obtain an epoxy group-containing polymer solution having a solid content of 50.6%.

(3) Then, 83.4 parts of the water-soluble polymer solution obtained in (1) above was mixed with 16.6 parts of the epoxy group-containing polymer solution obtained in (2) above, and the mixture was heated at 140° C. in a nitrogen atmosphere and reaction was conducted for 4 hours to obtain a solution of a water-soluble polymer having branches formed by reaction and bonding of the epoxy and carboxyl groups, which had a solid content of 50.3%.

(4) Separately, 2.4 parts of the epoxy group-containing polymer solution prepared in (2) above was mixed with 21.7 parts of xylene and 3.6 parts of cellulose acetate butyrate (CAB-381 0.1 supplied by Eastman Chemical Co.), and reaction was carried out at 140° C. in a nitrogen atmosphere for 4 hours. The reaction mixture was cooled to room temperature and 39.5 parts of water was added thereto. Then, water and a part of xylene were removed by distillation and the temperature was lowered to room temperature. Then, 13.8 parts of the solution of the water-soluble polymer having branches formed by reaction and bonding of the epoxy and carboxyl groups, which was prepared in (3) above, 1.0 part of 25% aqueous ammonia and 14.4 parts of n-butyl methacrylate were added to the reaction mixture, and the mixture was sufficiently stirred. Then, an aqueous solution of 0.1 part of potassium persulfate in 3.5 parts of water was added to the obtained aqueous dispersion and polymerization was carried out at 80° C. for 3 hours in a nitrogen atmosphere to obtain a cellulose ester-containing emulsion composition having a viscosity of 380 cps and a solid content of 39.7%. A coating prepared from this emulsion composition was transparent and excellent in the luster (60° specular surface transmittance: 85). Incidentally, coating of the emulsion composition was performed on a glass sheet by a 4-mil applicator. In the subsequent Examples and Comparative Examples, coating was conducted in the same manner.

EXAMPLE 2

(1) A reaction vessel equipped with a stirrer, a reflux cooler and a dropping funnel was charged with 45.4 parts of acetyl ethylene glycol methyl ether in a nitrogen atmosphere, and the ether was heated at 70° C. and a mixture of 47.3 parts of methyl acrylate, 2.4 parts of glycidyl methacrylate, 3.6 parts of $\alpha,\alpha'$-azobis(isobutyronitrile) and 0.7 part of n-dodecylmercaptan was added dropwise over a period of 2 hours. After completion of the dropwise addition, 0.6 part of $\alpha,\alpha'$-azobis(isobutyronitrile) was added over a period of 1 hour and polymerization was carried out at 70° C. for 7 hours to obtain an epoxy group-containing polymer solution having a solid content of 54.1%.

(2) Then, 84.3 parts of the water-soluble polymer solution obtained in (1) of Example 1 was mixed with 15.7 parts of the epoxy group-containing polymer solution prepared in (1) above, and reaction was carried out at 140° C. for 4 hours in a nitrogen atmosphere to obtain a solution of a water-soluble polymer having branches formed by reaction and bonding of the epoxy and carboxyl groups, which had a solid content of 50.8%.

(3) A solution was formed by adding 6.5 parts of the epoxy group-containing polymer solution obtained in (1) above and 23.6 parts of acetyl ethylene glycol monomethyl ether to 3.5 parts of acetyl cellulose (supplied by Daicel Kagaku Kogyo K.K.; acetylation degree=55%), and reaction was carried out at 140° C. for 4 hours in a nitrogen atmosphere. Then, 15.1 parts of the solution of the water-soluble polymer having branches formed by reaction and bonding of the epoxy and carboxyl groups, which was prepared in (2) above, was added to the reaction mixture, and 28.3 parts of a mixture of ethylene glycol monobutyl ether and acetyl ethylene glycol methyl ether was removed by distillation under reduced pressure. To the residue were added 33.0 parts of water, 0.8 part of 25% aqueous ammonia and 14.0 parts of methyl acrylate, and the mixture was sufficiently stirred to form a dispersion. An aqueous solution of 0.1 part of potassium persulfate in 3.4 parts of water was added to the obtained aqueous dispersion and polymerization was carried out at 80° C. for 3 hours in a nitrogen atmosphere to obtain a cellulose ester-containing emulsion composition having a viscosity of 580 cps and a solid content of 38.9%. A coating of the emulsion composition was transparent and excellent in the luster (60° specular surface transmittance: 76).

EXAMPLE 3

(1) A reaction vessel equipped with a stirrer, a reflux cooler and a dropping funnel was charged with 42.3 parts of acetyl ethylene glycol methyl ether and the ether was heated at 70° C., and a mixture of 33.3 parts of methyl methacrylate, 14.3 parts of 2-ethylhexyl acrylate, 1.8 parts of glycidyl methacrylate, 0.5 part of n-dodecylmercaptan and 2.7 parts of $\alpha,\alpha'$-azobis(isobutyronitrile) was added dropwise over a period of 2 hours. After completion of the dropwise addition, 0.4 part of $\alpha,\alpha'$-azobis(isobutyronitrile) and 4.7 parts of acetyl ethylene glycol methyl ether were added over a period of 1 hour and polymerization was carried out at 70° C. for 7 hours to obtain an epoxy group-containing polymer solution having a solid content of 52.1%.

(2) Then, 83.8 parts of the water-soluble polymer solution obtained in (1) of Example 1 was mixed with 16.2 parts of the epoxy group-containing polymer solution obtained in (1) above, and the mixture was heated at 140° C. in a nitrogen atmosphere and reaction was carried out for 4 hours to obtain a solution of a water-soluble polymer having branches formed by reaction and bonding of the epoxy and carboxyl groups, which had a solid content of 50.5%.

(3) To 5.9 parts of 30% water-wet nitrocellulose (SS 1/4, supplied by Daicel Kagaku Kogyo K.K.) were added 2.6 parts of the epoxy group-containing polymer solution and 24.6 parts of acetyl ethylene glycol methyl ether to form a solution, and reaction was carried out at 130° C. for 30 minutes in a nitrogen atmosphere. Then, 15.6 parts of the solution of the water-soluble polymer having branches formed by reaction and bonding of the epoxy and carboxyl groups, which was obtained in (2) above, was added to the reaction mixture, and 31.4 parts of water, ethylene glycol monobutyl ether and acetyl ethylene glycol methyl ether was removed by distillation under reduced pressure. To the residue were added 35.1 parts of water, 1.2 parts of 25% aqueous ammonia, 10.5 parts of methyl methacrylate and 4.5 parts 2-ethylhexyl acrylate, and the mixture was sufficiently stirred to form a dispersion. Then, a solution of 0.1 part of potassium persulfate in 1.9 parts of water was added to the so-formed dispersion and polymerization was carried out at 80° C. for 3 hours in a nitrogen atmosphere to obtain a cellulose ester-containing emulsion composition having a viscosity of 470 cps and a solid content of 39.1%. A coating of the emulsion composition was transparent, lustrous (60° specular surface transmittance: 86) and tough.

EXAMPLE 4

To 16.3 parts of 30% water-wet nitrocellulose (SS 1/4, supplied by Daicel Kagaku Kogyo K.K.) were added 7.3 parts of the epoxy group-containing polymer solution obtained in (1) of Example 3, 67.7 parts of acetyl ethylene glycol methyl ether and 8.7 parts of acetyl ethylene glycol butyl ether to form a solution, and reaction was carried out at 130° C. for 30 minutes in a nitrogen atmosphere. Then, 76.9 parts of a mixture of water, acetyl ethylene glycol methyl ether and acetyl ethylene glycol butyl ether was removed by distillation under reduced pressure to obtain an acrylic polymer-modified nitrocellulose solution.

Then, 15.2 parts of the above-mentioned acrylic polymer-modified nitrocellulose solution was mixed with 19.0 parts of methyl methacrylate, 8.1 parts of 2-ethylhexyl acrylate, 0.4 part of methacrylic acid, 52.1 parts of water, 1.4 parts of sodium dodecyl benzenesulfonate, 1.4 parts of Gafac RE-610 (anionic composite phosphate ester type emulsifier supplied by Toho Kagaku Kogyo K.K.) and 0.5 part of sodium hydrogencarbonate and the mixture was sufficiently stirred to form a dispersion. Then, an aqueous solution of 0.1 part of potassium persulfate in 1.8 parts of water was added to the dispersion and polymerization was carried out at 80° C. for 3 hours in a nitrogen atmosphere to obtain a cellulose ester-containing emulsion composition having a viscosity of 50 cps and a solid content of 40.1%. A coating of this emulsion composition was transparent, lustrous (60° specular surface transmittance: 85) and tough.

EXAMPLE 5

(1) In a reaction vessel equipped with a stirrer, a reflux cooler and a dropping funnel, 47.3 parts of xylene was heated at 100° C. in a nitrogen atmosphere, and a mixture of 48.0 parts of 48.0 parts of n-butyl methacrylate and 4.2 parts of 4,4'-azobis(cyanopentanoic acid chloride) was added dropwise over a period of 2 hours. After 1 hour from completion of the dropwise addition, 0.5 part of 4,4'-azobis(cyanopentanoic acid chloride) was added to the mixture and polymerization was carried out at 100° C. for 5 hours to obtain an acid chloride group-containing polymer solution having a solid content of 52.5%.

(2) Then, 2.3 parts of the acid chloride group-containing polymer solution obtained in (1) above was mixed with 21.7 parts of xylene and 3.6 parts of cellulose acetate butyrate (CAB-381 0.1 supplied by Eastman Chemical Co.), and reaction was carried out at 80° C. for 1 hour in a nitrogen atmosphere. Then, the reaction mixture was cooled to room temperature, and 39.4 parts of water, 1.3 parts of 25% aqueous ammonia and 13.8 parts of the solution of the water-soluble polymer having branches formed by reaction and bonding of the epoxy and carboxyl groups, which was obtained in (3) of Example 1, were added to the above reaction mixture. Then, water and a part of xylene were removed by distillation, and the residue was cooled to room temperature again. Then, 14.4 parts of n-butyl methacrylate was added to the residue and the mixture was sufficiently stirred to form a dispersion. An aqueous solution of 0.1 part of potassium persulfate in 3.4 parts of water was added to the aqueous dispersion and polymerization was carried out at 80° C. for 3 hours in a nitrogen atmosphere to obtain a cellulose ester-containing emulsion composition having a viscosity of 210 cps and a solid content of 39.5%. Coating of the emulsion composition was transparent and lustrous (60° specular surface transmittance: 83).

The second embodiment of the invention will be illustrated below in line with examples thereof.

SYNTHESIS EXAMPLE 1

Into a reactor equipped with a stirrer, reflux condenser, thermometer, and dropper was charged 44.0 parts of ethylene glycol monobutyl ether in an atmosphere of nitrogen. The reactant was heated to 100° C. Then a mixture of 15.1 parts of methyl methacrylate, 16.3 parts of 2-ethylhexyl methacrylate, 1.0 part of 2-hydroxyethyl methacrylate, 9.4 parts of acrylic acid, 6,7 parts of ethyl acrylate, and 2.8 parts of $\alpha,\alpha'$-azobis(isobutyronitrile) was added dropwise over a 2-hour interval. Three hours later, a mixture of $\alpha,\alpha'$-azobisisobutyronitrile 0.2 part and ethylene glycol monobutyl ether 4.5 parts was added, and polymerization reaction was carried out at 100° C. for 5 hours. Thus, a water-soluble polymer solution containing 50.2% of solids was obtained.

Into another reactor equipped with a stirrer, reflux condenser, thermometer, and dropper was charged 42.3 parts of ethylene glycol monobutyl ether in an atmosphere of nitrogen. The reactant was heated to 75° C. Then, a mixture of methyl methacrylate 33.3 parts, 2-ethylhexyl methacrylate 14.3 parts, glycidyl methacrylate 1.8 part, $\alpha,\alpha'$-azobisisobutyronitrile 2.7 parts, and n-dodecyl mercaptan 0.5 part was added dropwise over a 2-hour interval. Three hours later, a mixture of $\alpha,\alpha'$-azobisisobutyronitrile 0.4 part and ethylene glycol monobutyl ether 4.7 parts was added, and polymerization reaction was carried out at 75° C. for 8 hours. Thus, a water-soluble polymer solution containing 52.1% of epoxy group was obtained.

Then, 83.5 parts of the former water-soluble polymer solution and 16.5 parts of the latter water-soluble polymer solution containing the epoxy group were mixed and stirred at 130° C. for 8 hours. After that, on removing a part of ethylene glycol monobutyl ether by vacuum distillation, a grafted hydrophilic resin solution containing 73.1% of solids was obtained.

EXAMPLE 6

(1) Into a reactor equipped with a stirrer, reflux condenser, thermometer, and dropper were charged 67.1 parts of ethylene glycol monoethyl ether acetate and 10.1 parts of cellulose acetate butyrate (CAB381-0.5, made by Eastman Chemical) in an atmosphere of nitrogen. The reactants were stirred at 60° C. for 30 minutes and then heated to 130° C. Then, 1.4 parts of glycidyl methacrylate and 0.01 part of hydroquinone monomethyl ether were added, and reaction was carried out at 130° C. for 3 hours. The reactants were cooled to 80° C. A mixture of 14.1 parts of methyl methacrylate, 6.0 parts of 2-ethylhexyl acrylate, and 1.3 part of benzoyl peroxide was added dropwise over a 2-hour interval. After that, polymerization reaction was carried out at 80° C. for 8 hours. A part of ethylene glycol monoethyl ether acetate was removed by vacuum distillation. Thus, a acrylic resin-grafted cellulose acetate butyrate solution containing 75.4% of solids was obtained.

(2) Into another reactor equipped with a stirrer, reflux condenser, thermometer, and dropper were charged 16.3 parts of the grafted hydrophilic resin solution obtained in Synthesis Example 1, 1.6 parts of 28% ammonia water, 43.1 parts of water, 10.4 parts of methyl methacrylate, 4.4 parts of 2-ethylhexyl acrylate, and 21.5 parts of the acrylic resin-grafted cellulose acetate butyrate solution obtained in above (1). The reactants were dispersed completely with stirring. To the resulting dispersion was added an aqueous solution of 0.1 part of potassium persulfate dissolved in 2.6 parts of water. Polymerization reaction was carried out at 80° C. for 3 hours. Thus, a cellulose derivative-containing emulsion having a viscosity of 480 cps. and containing 42.0% of solids was obtained. This emulsion gave a transparent, glossy coating. The 60° reflectance was 79.

EXAMPLE 7

An aqueous coating liquid containing 45.2% of solids was obtained by adding 10 parts of water and 20 parts of melamine resin ("Sumimal M-40W" made by Sumitomo Chemical Industry Co., Ltd.) to 70 parts of the emulsion obtained in Example 6. This aqueous coating liquid was applied to a mild steel sheet using a No. 30 bar coater, followed by heating at 140° C. for 30 minutes. The resulting transparent coating was good in adhesion and gloss (60° reflectance of 80), and had a pencil hardness of 2H.

EXAMPLE 8

(1) Into a reactor equipped with a stirrer, reflux condenser, thermometer, and dropper were charged 62.3 parts of methyl ethyl ketone and 9.3 parts of cellulose acetate butyrate (CAB554-0.4, made by Eastman Chemical) in an atmosphere of nitrogen. The reactants were stirred at 60° C. for 30 minutes. After cooling to 30° C., 1.5 parts of 4,4'-azobis(cyanopentanoic chloride), and reaction was carried out at 30° C. for 8 hours. Then, a mixture of 13.1 parts of methyl methacrylate and 5.6 parts of 2-ethylhexyl acrylate was added, and reaction was carried out at 80° C. for 12 hours. Subsequently, a mixture of 0.7 part of α,α'-azobisisobutyronitrile and 7.5 parts of methyl ethyl ketone was added, and reaction was carried out 80° C. for 2 hours. A part of methyl ethyl ketone was removed by distillation. Thus, an acrylic polymer-grafted cellulose acetate butyrate solution containing 78.4% of solids was obtained.

(2) Into another reactor equipped with a stirrer, reflux condenser, thermometer, and dropper were charged 16.7 parts of the grafted hydrophilic resin solution obtained in Synthesis Example 6, 1.7 parts of 28% ammonia water, 43.2 parts of water, 10.6 parts of methyl methacrylate, 4.6 parts of 2-ethylhexyl acrylate, and 20.4 parts of the acrylic polymer-grafted cellulose acetate butyrate solution obtained in above (1). The reactants were dispersed completely with stirring. To the resulting dispersion was added an aqueous solution of 0.1 part of potassium persulfate dissolved in 2.7 parts of water. Polymerization reaction was carried out at 80° C. for 5 hours. Thus, a cellulose derivative-containing emulsion having a viscosity of 1830 cps and containing 43.4% of solids was obtained. This emulsion gave a transparent, glossy coating having a 60° reflectance of 73.

EXAMPLE 9

(1) Into a reactor equipped with a stirrer, reflux condenser, thermometer, and dropper were charged 58.0 parts of methyl ethyl ketone, 25.9 parts of water, and 2.9 parts of cellulose acetate butyrate (CAB553-0.4, made by Eastman Chemical) in an atmosphere of nitrogen. The reactants were stirred at 50° C. for 2 hours. Then, 2.7 parts of n-butyl methacrylate was added dropwise over 3 hours and after that 9.8 parts of a solution of 2.7 parts of cerium (IV) nitrate ammonium dissolved in 9.8 parts of 1 N nitric acid was added dropwise over 3 hours. Reaction was carried out at 50° C. for 12 hours. Methyl ethyl ketone and a part of water were removed by vacuum distillation. An aqueous solution of 0.3 part of sodium hydroxide dissolved in 599.7 parts of water was added. After complete stirring, the resulting resin was separated by a centrifuge and vacuum dried at 40° C. for 120 hours. Thus, acrylic resin-grafted cellulose acetate was obtained.

(2) Into another reactor equipped with a stirrer, reflux condenser, thermometer, and dropper were charged 13.7 parts of the acrylic resin-grafted cellulose acetate obtained in above (1) and 21.5 parts of n-butyl methacrylate. The reactants were stirred at 30° C. for 2 hours. To the resulting dispersion were added 3.0 parts of sodium dodecylbenzene sulfonate, 3.0 parts of Gafac RE-610 (anionic emulsifier of phosphoric ester type, made by Toho Chemical Industry Co., Ltd.), 0.7 part of sodium hydrogen carbonate, and 53.2 parts of water. The reactants were dispersed with stirring at 50° C. To the resulting dispersion was added an aqueous solution of 0.1 part of potassium persulfate dissolved in 4.8 parts of water. Polymerization reaction was carried out at 80° C. for 5 hours. Thus, a cellulose derivative-containing emulsion having a viscosity of 620 cps and containing 40.6% of solids was obtained. This emulsion gave a transparent, glossy coating having a 60° reflectance of 77.

EXAMPLE 10

(1) Into a reactor equipped with a stirrer, reflux condenser, thermometer, and dropper were charged 23.4 parts of 30% water-wet nitrocellulose (SS 1/4, made by Daicel Chemical Industry Co., Ltd.), 61.0 parts of water, 10.7 parts of methyl methacrylate, and 4.6 parts of 2-ethylhexyl acrylate. The reactants were stirred at 30° C. for 2 hours. Then, 0.1 part of tri-n-butyl boron was added three times at 2-hour intervals. Polymerization reaction was carried out at 30° C. for 8 hours. To 40.7 parts of the resulting mixture liquid of water and acrylate-grafted nitrocellulose were added 17.5 parts of methyl methacrylate, 6.8 parts of 2-ethylhexyl acrylate, 24.9 parts of water, 3.0 parts of sodium dodecylbenzenesulfonate, 3.0 parts of Gafac RE-610 (anionic emulsifier of phosphoric ester type, made by Toho Chemical Industry Co., Ltd.), and 3.0 parts of sodium hydrogen carbonate. The reactants were dispersed with stirring at 50° C. To the resulting dispersion was added an aqueous solution of 0.1 part of potassium persulfate dissolved in 3.3 parts of water. Polymerization reaction was carried out at 80° C. for 3 hours in a nitrogen stream. Thus, a cellulose derivative-containing emulsion having a viscosity of 145 cps and containing 41.4% of solids was obtained. This emulsion gave a transparent, glossy coating having a 60° reflectance of 83.

EXAMPLE 11

(1) Into a reactor equipped with a stirrer, reflux condenser, thermometer, and dropper were charged 9.7 parts of cellulose acetate (acetylation degree of 55%, made by Daicel Chemical Industry Co., Ltd.) and 64.9 parts of methyl ethyl ketone in an atmosphere of nitrogen. The reactants were stirred at 60° C. for 1 hour. Then, 1.9 parts of maleic anhydride and 0.3 part of pyridine were added dropwise, and reaction was carried out at 80° C. for 3 hours. Then, 2.1 parts of styrene, 11.7 parts of methyl acrylate, 1.6 parts of benzoyl peroxide, and 7.8 parts of ethylene glycol monomethyl ether acetate were added dropwise over 2 hours. Polymerization reaction was carried out at 80° C. for 6 hours. Methyl ethyl ketone was removed by vacuum distillation. Thus, an acrylic resin-grafted cellulose acetate solution was obtained.

(2) Into another reactor equipped with a stirrer, reflux condenser, thermometer, and dropper were charged 22.6 parts of the acrylic resin-grafted cellulose acetate solution obtained in above (1), 3.1 parts of styrene, 17.8 parts of methyl acrylate, 44.8 parts of water, 3.2 parts of sodium dodecylbenzenesulfonate, 3.2 parts of Gafac RE-610 (anionic emulsifier of phosphoric ester type, made by Toho Chemical Industry Co., Ltd.), and 0.7 part of sodium hydrogen carbonate. The reactants were dispersed with stirring at 40° C. To the resulting dispersion was added an aqueous solution of 0.1 part of potassium persulfate dissolved in 4.5 parts of water. Polymerization reaction was carried out at 80° C. for 5 hours. Thus, a cellulose derivative-containing emulsion having a viscosity of 450 cps and containing 43.1% of solids was obtained. This emulsion gave a transparent, glossy coating having a 60° reflectance of 71.

COMPARATIVE EXAMPLE 1

To a jacketed colloid mill were added 2.0 parts of Gafac RE-610 (anionic emulsifier of phosphoric ester type, made by Toho Chemical Industry Co., Ltd.), 1.3 parts of sodium dodecylbenzenesulfonate, 0.5 part of sodium hydrogen carbonate, 33.5 parts of water, 0.6 part of methacrylic acid, 20.6 parts of methyl methacrylate, 20.6 parts of ethyl acrylate, 0.01 part of hydroquinone methyl ether, and 13.9 parts of cellulose acetate butyrate (CAB381-0.1, made by Eastman Chemical). The mixture was subjected to emulsification for 30 minutes. The resulting dispersion was charged into a reactor equipped with a stirrer, reflux condenser, and dropper. To this reactor were further added 0.03 part of n-dodecylmercaptan and 0.01 part of 0.15% ferric ammonium sulfate. Then, three-fifths of an initiator mixture of 0.08 part of potassium persulfate, 0.6 part of Triton X-100 (nonionic surface active agent, made by Rohm & Haas Co.), and 6.25 parts of water was added dropwise over 118 minutes at 71° to 76° C. The remainder of the initiator mixture and 0.02 part of sodium sulfite were added over 45 minutes at 75° to 76° C., and polymerization was carried out in an atmosphere of nitrogen. The polymerization liquid formed aggregates in large quantities and coagulation occurred in the course of polymerization.

COMPARATIVE EXAMPLE 2

Into a reactor equipped with a stirrer, reflux condenser, and dropper were charged 3.5 parts of Gafac RE-610, 3.5 parts of sodium n-dodecylbenzenesulfonate, 0.8 part of sodium hydrogen carbonate, 5.1 parts of acetyl cellulose (acetylation degree 55%, made by Daicel Chemical Co., Ltd.), 55.5 parts of water, 1.5 parts of 25% ammonia water, and 25.2 parts of methyl acrylate. The reactants were dispersed with stirring. To the resulting dispersion was added an aqueous solution of 0.1 part of potassium persulfate dissolved in 4.8 parts of water, and polymerization was carried out at 80° C. in an atmosphere of nitrogen. However, in the course of polymerization, separation of polymer and water occurred and it was difficult to continue polymerization.

COMPARATIVE EXAMPLE 3

Into a reactor equipped with a stirrer, reflux condenser, and dropper were charged 9.3 parts of 30% water-wet nitrocellulose (SS 1/4, made by Daicel Chemical Industry Co., Ltd.), 22.5 parts of methyl methacrylate, 122 parts of 2-ethylhexyl acrylate, 0.3 part of methacrylic acid, 50.8 parts of water, 0.6 part of sodium hydrogen carbonate, 1.3 parts of sodium dodecylbenzenesulfonate, and 1.3 parts of Gafac RE-610. The reactants were dispersed with stirring. To the resulting dispersion was added an aqueous solution of 0.1 part of potassium persulfate dissolved in 1.6 parts of water, and polymerization was carried out at 80° C. for 3 hours in an atmosphere of nitrogen. A cellulose ester-containing emulsion having a viscosity of 20 cs. and containing 43.8% of solids was obtained. This emulsion gave a transparent glossy coating having a 60° reflectance of 85, but the coating was considerably brittle.

The embodiments of the invention in which an exclusive property or privilege is claimed are defined as follows:

1. An aqueous emulsion of a polymer composition prepared by (1) effecting an intermolecular grafting reaction between a cellulose ester and a first vinyl polymer to obtain a vinyl polymer-grafted cellulose ester, said first vinyl polymer having a molecular weight in the range of from 300 to 200,000 and containing in the molecule at least one functional group selected from the group consisting of epoxy, carboxyl, acid halide, acid anhydride, isocyanate, active halogen, N-methylol and N-methylol ether, (2) mixing said vinyl polymer-grafted cellulose ester with at least one radical-polymerizable, ethylenically unsaturated monomer, which monomer is adapted to form a second polymer compatible with said first vinyl polymer, whereby to obtain a reaction mixture, and then (3) subjecting said reaction mixture, in an aqueous medium, in the presence of a dispersion stabilizer, to emulsion polymerization effective to polymerize said monomer, in situ, to form said second polymer, and thereby obtain the aqueous emulsion.

2. An aqueous emulsion as claimed in claim 1 in which said first vinyl polymer has a molecular weight of from 300 to 20,000.

3. An aqueous emulsion as claimed in claim 1 in which said cellulose ester is selected from the group consisting of nitrocellulose, cellulose acetate butyrate, cellulose acetate propionate, cellulose acetate phthalate, acetyl cellulose, cellulose propionate, cellulose butyrate, cellulose phosphate and cellulose sulfate.

4. An aqueous emulsion as claimed in claim 1 in which said vinyl polymer-grafted cellulose ester is prepared by mixing a solution of said first vinyl polymer with a solution of said cellulose ester and maintaining the mixture at a temperature in the range of from 0° to 200° C. for from 1 minute to about 5 hours until said vinyl polymer-grafted cellulose ester is formed.

5. An aqueous emulsion of a polymer composition prepared by (1) polymerizing at least one first monomer in the presence of at least one cellulosic polymer to form a random-graft cellulosic polymer in which a polymer of said first monomer is randomly grafted to said cellulosic polymer, said polymer of said first monomer having a molecular weight in the range of from 300 to 200,000, (2) mixing said random-graft cellulosic polymer with at least one radical-polymerizable, ethylenically unsaturated, second monomer which dissolves said random-graft cellulosic polymer whereby to obtain a reaction mixture, and then (3) subjecting said reaction mixture, in an aqueous medium, in the presence of a dispersion stabilizer, to emulsion polymerization to polymerize said second monomer, in situ, to form a second polymer which is compatible with the polymer of said first monomer, and thereby obtain the aqueous emulsion.

6. An aqueous emulsion as claimed in claim 5 in which said polymer of said first monomer has a molecular weight of from 300 to 20,000.

7. An aqueous emulsion as claimed in claim 5 in which said cellulosic polymer has a molecular weight in the range of 5,000 to 50,000 and is selected from the group consisting of cellulose, alkali cellulose, nitrocellulose, cellulose acetate butyrate, cellulose acetate propionate, acetyl cellulose, cellulose phosphate, cellulose sulfate, methyl cellulose, ethyl cellulose, butyl cellulose, carboxymethyl cellulose and hydroxyethyl cellulose.

8. An aqueous emulsion as claimed in claim 5 in which said cellulosic polymer has a molecular weight in the range of from 5,000 to 50,000 and is selected from the group consisting of nitrocellulose, cellulose acetate butyrate and acetyl cellulose.

9. An aqueous emulsion as claimed in claim 5 in which said first monomer and said second monomer are vinyl monomers which are miscible with each other.

10. An aqueous emulsion as claimed in claim 5 in which said first monomer and said second monomer are the same vinyl monomers.

11. An aqueous emulsion of a polymer composition prepared by emulsion polymerizing at least one radical-polymerizable, ethylenically unsaturated monomer, in the presence of at least one modified cellulose ester modified by having a first vinyl polymer grafted thereto wherein said first vinyl polymer has a molecular weight in the range of from 300 to 200,000, and in the presence of water and a dispersion stabilizer, whereby to polymerize said radical-polymerizable, ethylenically unsaturated monomer, in situ, to form a second polymer and thereby obtain the aqueous emulsion, said modified cellulose ester being soluble in said monomer and said first vinyl polymer being compatible with said second polymer.

12. An aqueous emulsion as claimed in claim 11 in which said first vinyl polymer has a molecular weight of from 300 to 20,000.

13. An aqueous emulsion as claimed in claim 11 in which said cellulose ester is selected from the group consisting of nitrocellulose, cellulose acetate butyrate, cellulose acetate propionate, cellulose acetate phthalate, acetyl cellulose, cellulose propionate, cellulose butyrate, cellulose phosphate and cellulose sulfate.

* * * * *